(12) United States Patent
Mayer

(10) Patent No.: US 12,036,913 B2
(45) Date of Patent: Jul. 16, 2024

(54) APPARATUS AND METHOD FOR PLACING A TARPAULIN ON A PAYLOAD OF A MOVEABLE VEHICLE

(71) Applicant: David J. Mayer, St. Charles, MI (US)

(72) Inventor: David J. Mayer, St. Charles, MI (US)

( * ) Notice: Subject to any disclaimer, the term of this patent is extended or adjusted under 35 U.S.C. 154(b) by 870 days.

(21) Appl. No.: 17/073,748

(22) Filed: Oct. 19, 2020

(65) Prior Publication Data

US 2021/0114509 A1    Apr. 22, 2021

Related U.S. Application Data

(60) Provisional application No. 62/923,171, filed on Oct. 18, 2019.

(51) Int. Cl.
*B60P 7/08* (2006.01)
*B60P 1/48* (2006.01)

(52) U.S. Cl.
CPC .............. *B60P 7/0876* (2013.01); *B60P 1/48* (2013.01)

(58) Field of Classification Search
CPC .. B60P 7/0876; B60P 1/48; B60P 7/04; B66F 9/061; B66F 9/0655
USPC ................. 414/910, 911, 607, 618, 619, 626
See application file for complete search history.

(56) References Cited

U.S. PATENT DOCUMENTS

| | | | | |
|---|---|---|---|---|
| 3,759,399 | A * | 9/1973 | Glass | B66C 1/22 212/347 |
| 3,788,492 | A * | 1/1974 | Kraft | B66F 9/061 212/292 |
| 5,127,791 | A * | 7/1992 | Attman | B66F 9/10 52/745.11 |
| 7,598,922 | B2 * | 10/2009 | Brooks | B64G 1/222 343/DIG. 2 |
| 8,075,240 | B2 * | 12/2011 | Stevenson | B60J 7/102 414/607 |
| 8,568,078 | B2 * | 10/2013 | Ornig | B66F 9/12 414/664 |
| 2012/0177469 | A1 * | 7/2012 | Robbins | B65G 7/12 414/626 |
| 2017/0297473 | A1 * | 10/2017 | Baareman | B65H 75/4492 |

* cited by examiner

*Primary Examiner* — Lynn E Schwenning
(74) *Attorney, Agent, or Firm* — Robert L. Stearns; Dickinson Wright PLLC

(57) ABSTRACT

Apparatus for positioning a tarp on a payload carried on the bed of a vehicle includes a tarp lifting device having a carriage engagable with forks of a forklift truck and a support arm projecting from the carriage. Lifting hooks are provided on the support arm and engage anchor points of the tarp which is raised and drawn into position over the payload. Once placed, the support arm is lowered and the hooks drop free of the anchor points. The placement of the tarp occurs without an operator being on the bed or on top of the payload and the hooks disengage without assistance from the operator.

19 Claims, 9 Drawing Sheets

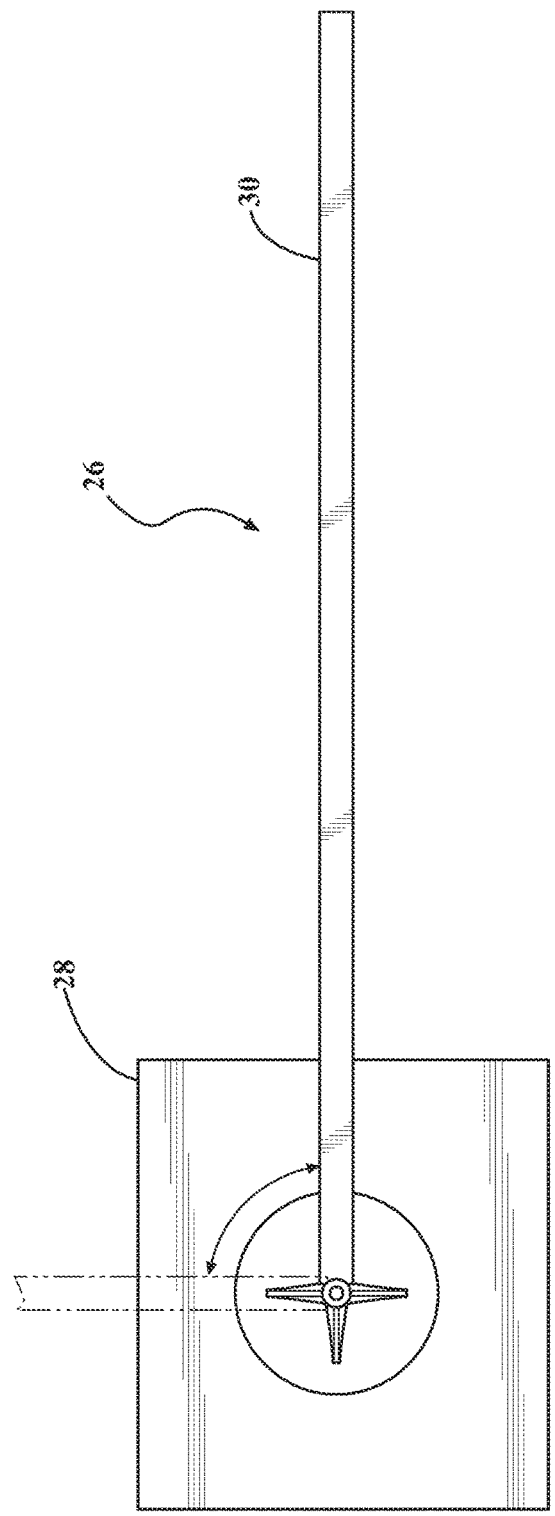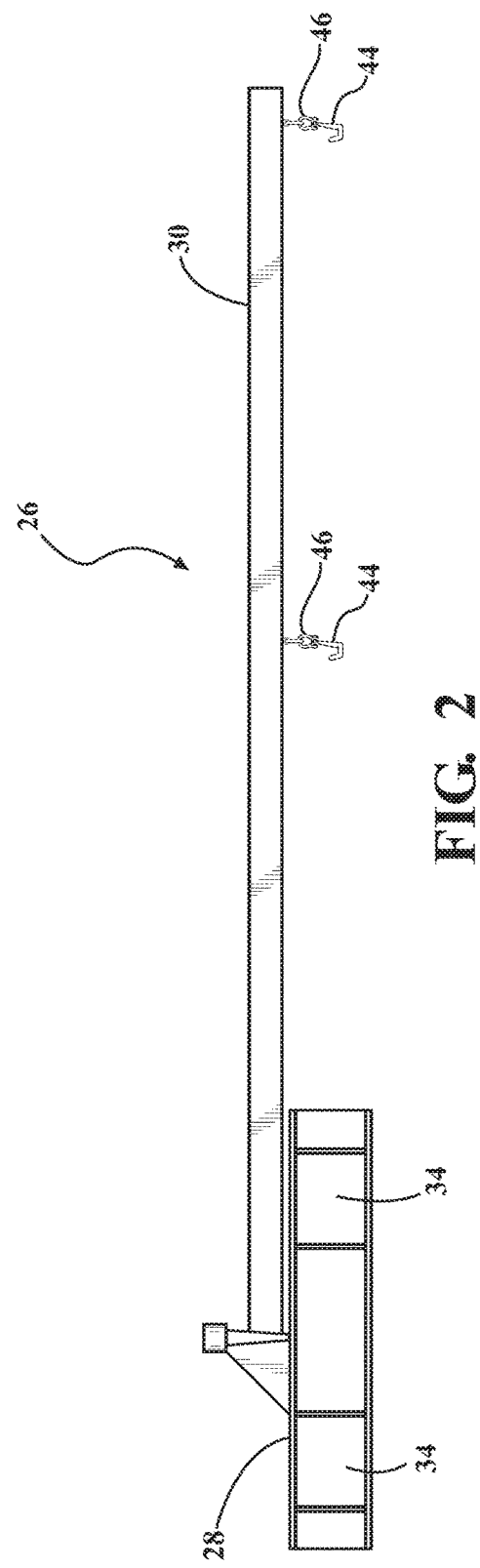

APPARATUS AND METHOD FOR PLACING A TARPAULIN ON A PAYLOAD OF A MOVEABLE VEHICLE

CROSS-REFERENCE TO RELATED APPLICATION

This U.S. patent application claims priority to U.S. Provisional Patent Application No. 62/923,171, filed Oct. 18, 2019, the entire contents of which are incorporated herein by reference.

BACKGROUND OF THE INVENTION

1. Technical Field

This invention related generally to apparatus and methods for placing a tarpaulin on a payload carried by a mobile vehicle.

2. Related Art

It is known to transport a payload, such as a load of drywall or other goods, equipment or cargo, on the open bed of a mobile vehicle which may comprise the bed of a flatbed truck or a trailer.

When inclement weather is expected or if the payload is otherwise to be covered or protected from the elements, it is common to cover the payload with a flexible tarpaulin. The task of tarping a payload can be labor intensive and potentially dangerous, as it often requires at least one person to climb onto the bed of the vehicle and often on top of the payload to drape or assist in draping the tarp into position over the payload. At least one other person is often utilized to assist with manipulating and positioning the tarp, which is often heavy and cumbersome, and the additional person(s) may be on the ground or also on the bed depending on the requirements of a particular job.

The bed of such payload hauling vehicles is elevated off the ground by several feet and the payload that sits on the bed may itself rise several more feet above the bed, making the person climb 4 to 10 feet or more above ground level without the benefit of safety rails or other means to protect the person in the event of a fall. Such vehicles are also often equipped with an onboard crane for use in offloading the payload at a delivery site. The crane typically includes a telescoping payload boom that projects from a base at the front of the bed and which is supported when not in use in a boom rack provided at the rear of the bed and whose upper end is elevated to securely cradle the payload boom above the level of payload in transport and when not in use. The presence of the payload boom and associated boom rack further complicates the placement of the tarp since the tarp must be manually manipulated from the side to maneuver the tarp beneath the payload boom and in front of the boom rack. In addition to the complexity in placing a tarp, the structure of the payload boom and boom rack present undesired opportunities for operators to encounter the structure when on the bed or payload to place the tarp.

SUMMARY

Apparatus and method are provided for placing a tarp on a payload resting on the elevated bed of a moveable vehicle without requiring an operator to leave the ground.

According to one aspect, a tarp engaging apparatus includes a carriage engagable with forks of a fork lift truck and a support arm projecting from the carriage and supporting lifting hooks which engage with anchor rings of the tarp to lift and place the tarp over a payload with movement of the forklift and then self-release from the anchor rings of the tarp when the carriage and its support arm is lowered after placement of the tarp.

According to another aspect, the hooks are generally J-shaped and mounted on the support arm by linkages that enable the hooks to rotate, pivot and translate relative to the support arm which facilitates their ability to engage the anchor rings and draw the tarp into position while the linkages are tensioned, and which further enable the hooks to self-release after the tarp is placed and the support arm lowered through slackening of the tension which causes the hooks to fall away from the anchor rings.

According to a further aspect, the apparatus includes a tarp guide which is positionable over a boom rack of the payload vehicle to shield the tarp from direct contact with the boom rack during placement and which provides a smooth and uniform surface across which the tarp can be drawn to assist in the placement of the tarp over the payload.

According to a further aspect, the tarp guide includes fork-engaging flats provided on a cross bar of the tarp guide for engagement by forks of a forklift truck for lifting the tarp guide into and out of supported engagement with the boom rack, and wherein the flats are arranged in position to be engaged by the forks of the fork truck but are also out of the path of engagement by the tarp when drawn across the cross bar of the tarp guide during placement of the tarp.

According to a further aspect, the apparatus includes a tarp storage station for storing a tarp in ready condition for positioning on a payload.

THE DRAWINGS

These and other features and advantages of the invention will become better understood when considered in connection with the following drawings and detailed description, in which:

FIG. 1 is a plan view of an embodiment of a tarp lifting device;

FIG. 2 is a side elevation view of the device of FIG. 1;

DETAILED DESCRIPTION OF EMBODIMENTS OF THE INVENTION

Figure 3:
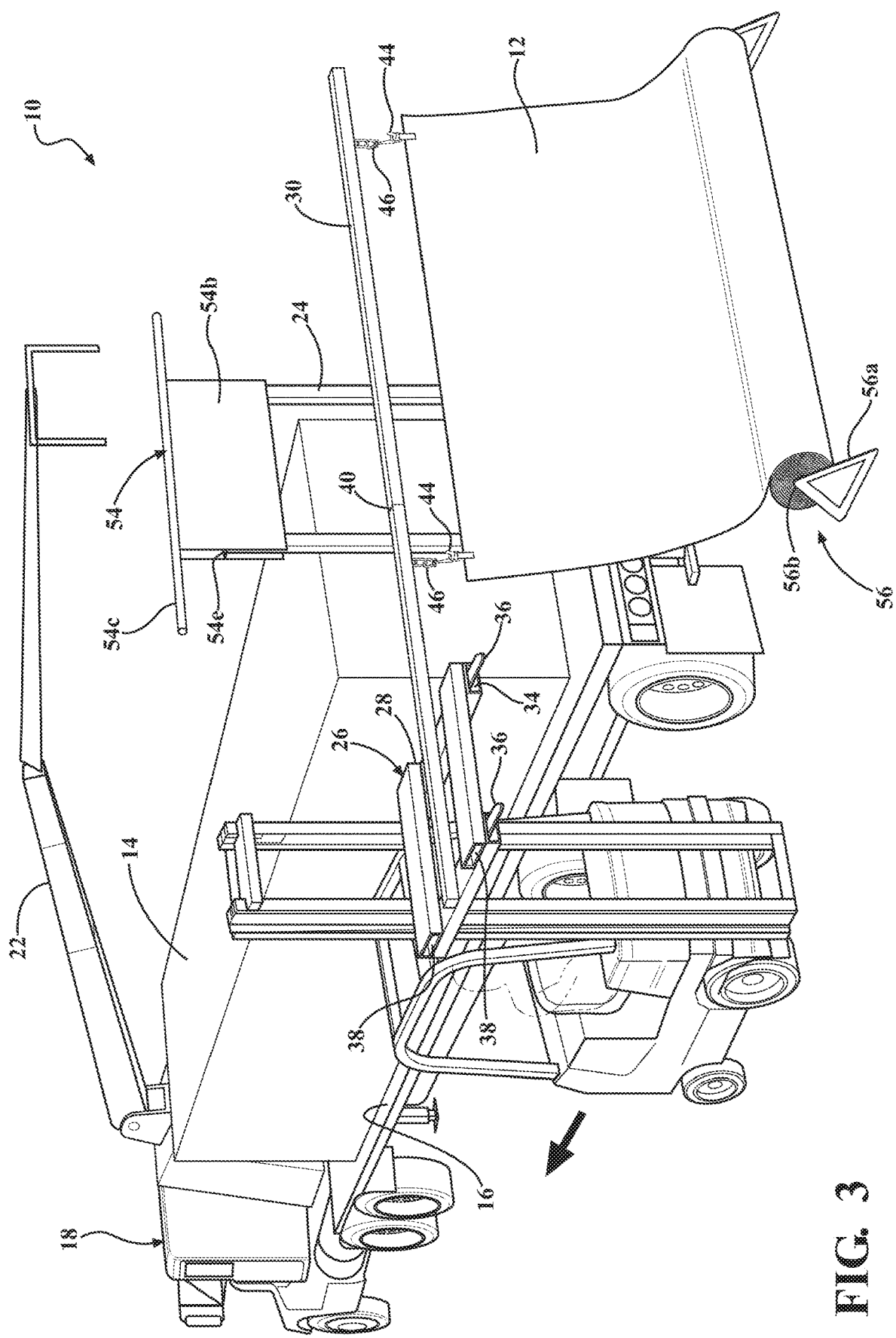
FIG. 3 is a perspective view of an embodiment of the apparatus for placing a tarp on a payload.
Figure 4:
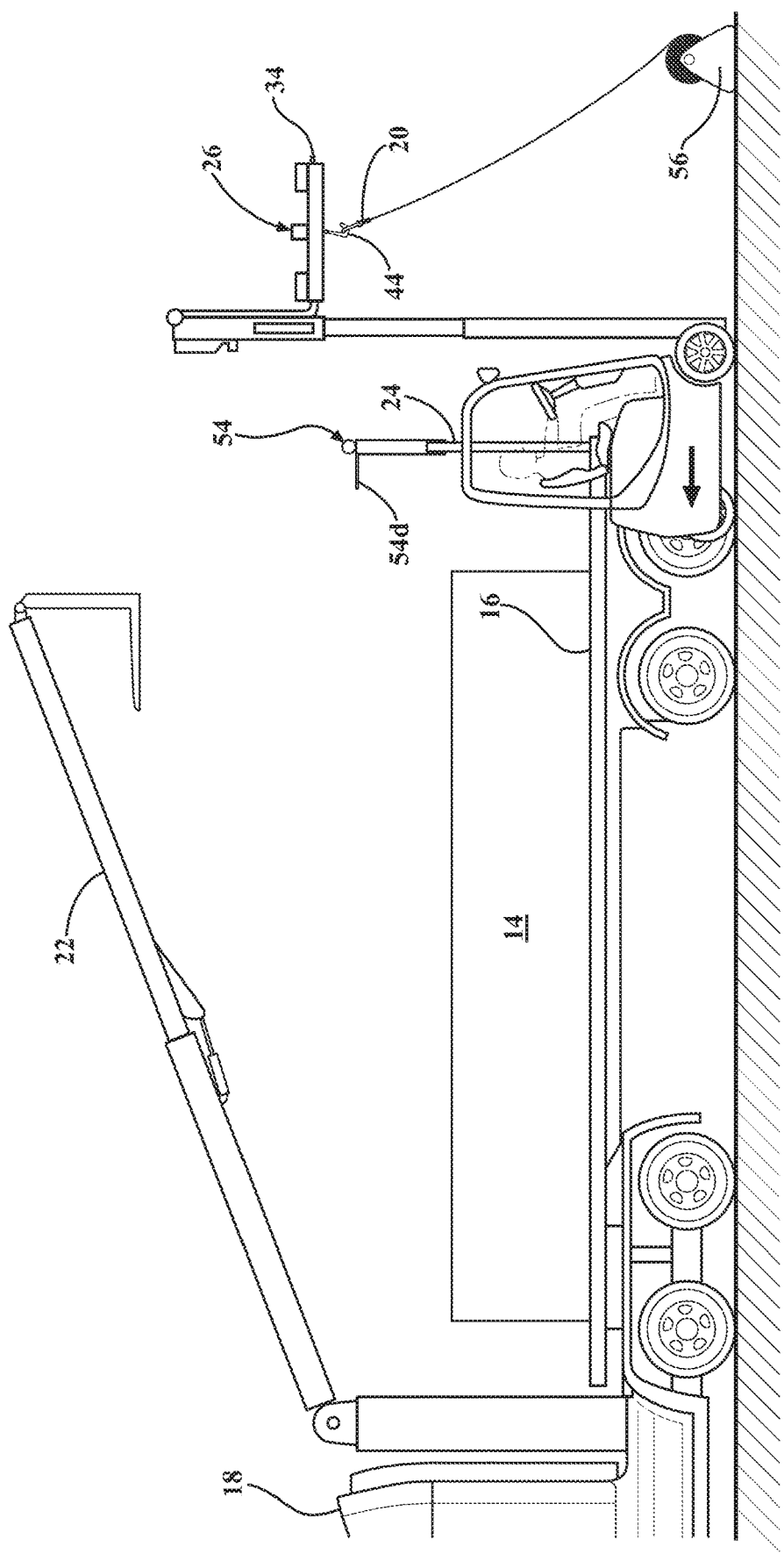
FIGS. 4-7 are side elevation views of the apparatus in stages of use in placing the tarp on the payload.
Figure 5:
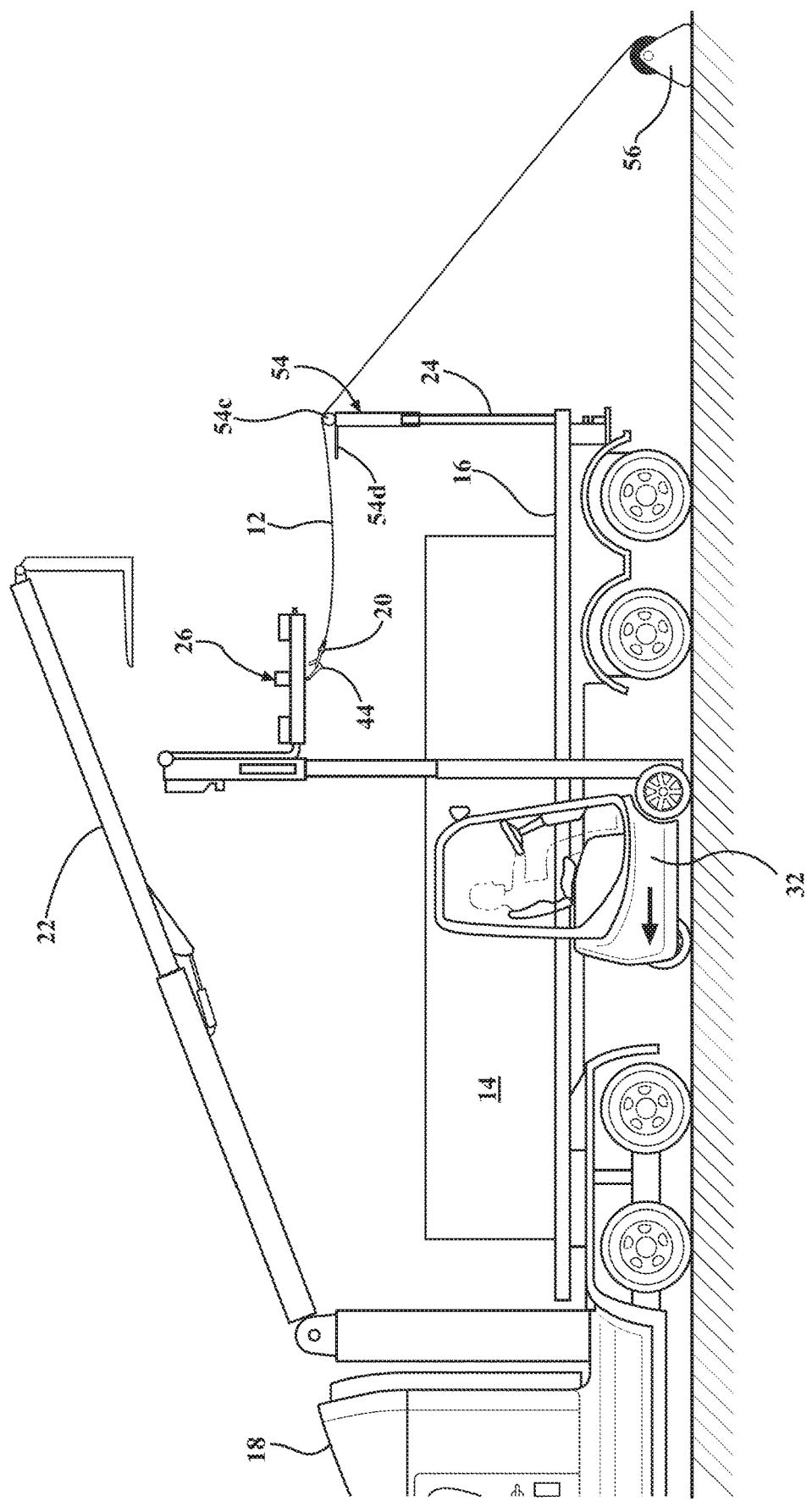
Figure 6:
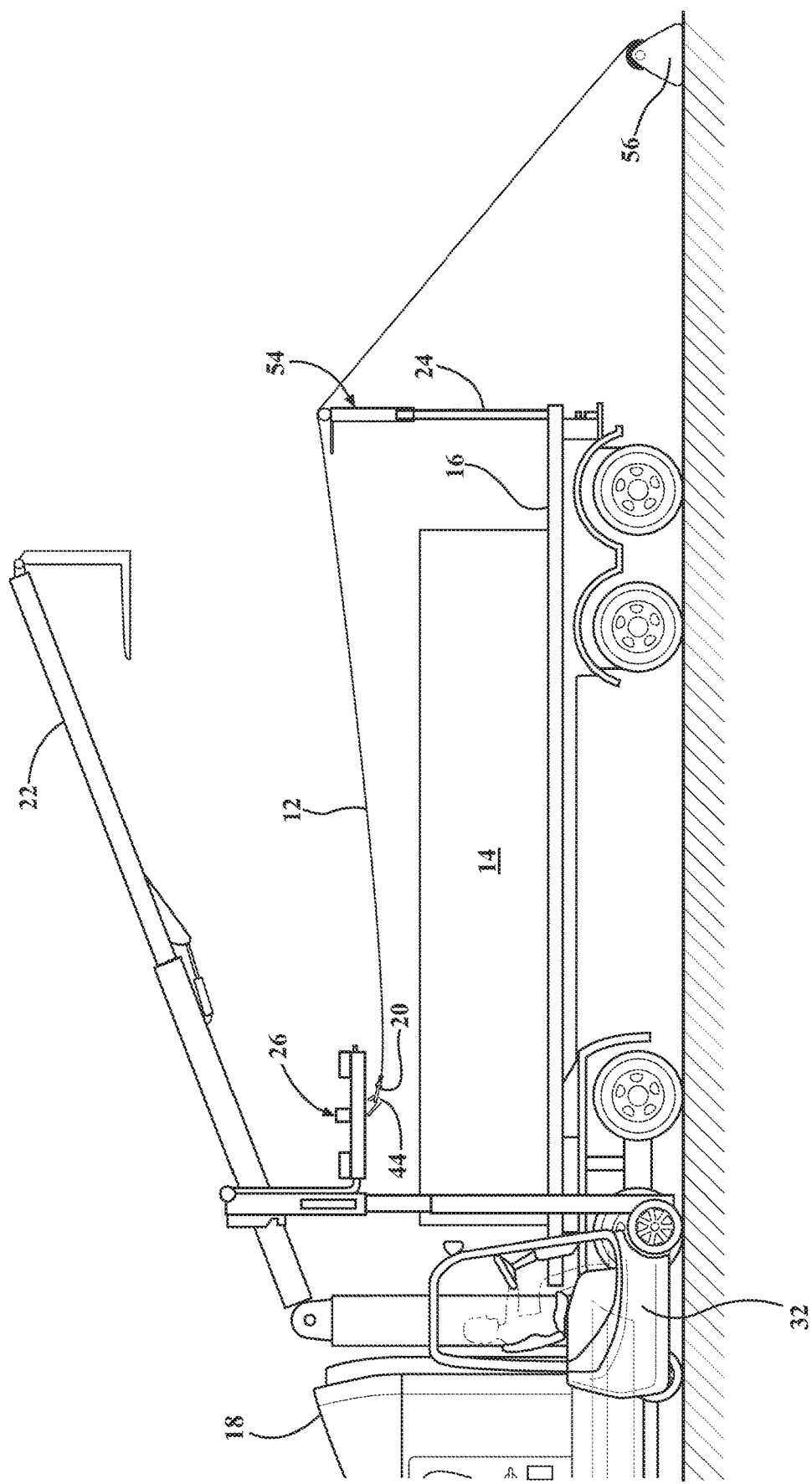
Figure 7:
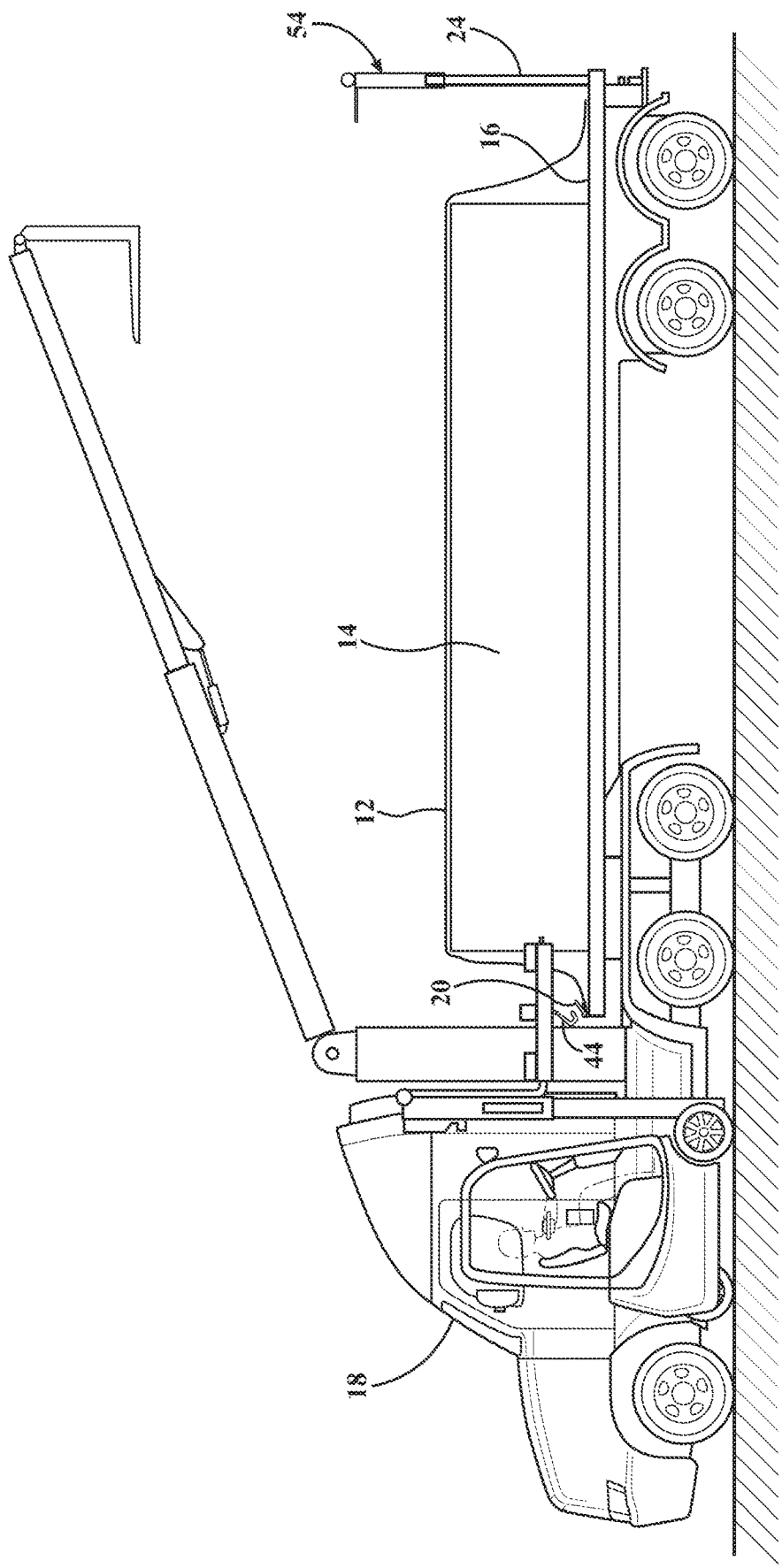
Figure 8:
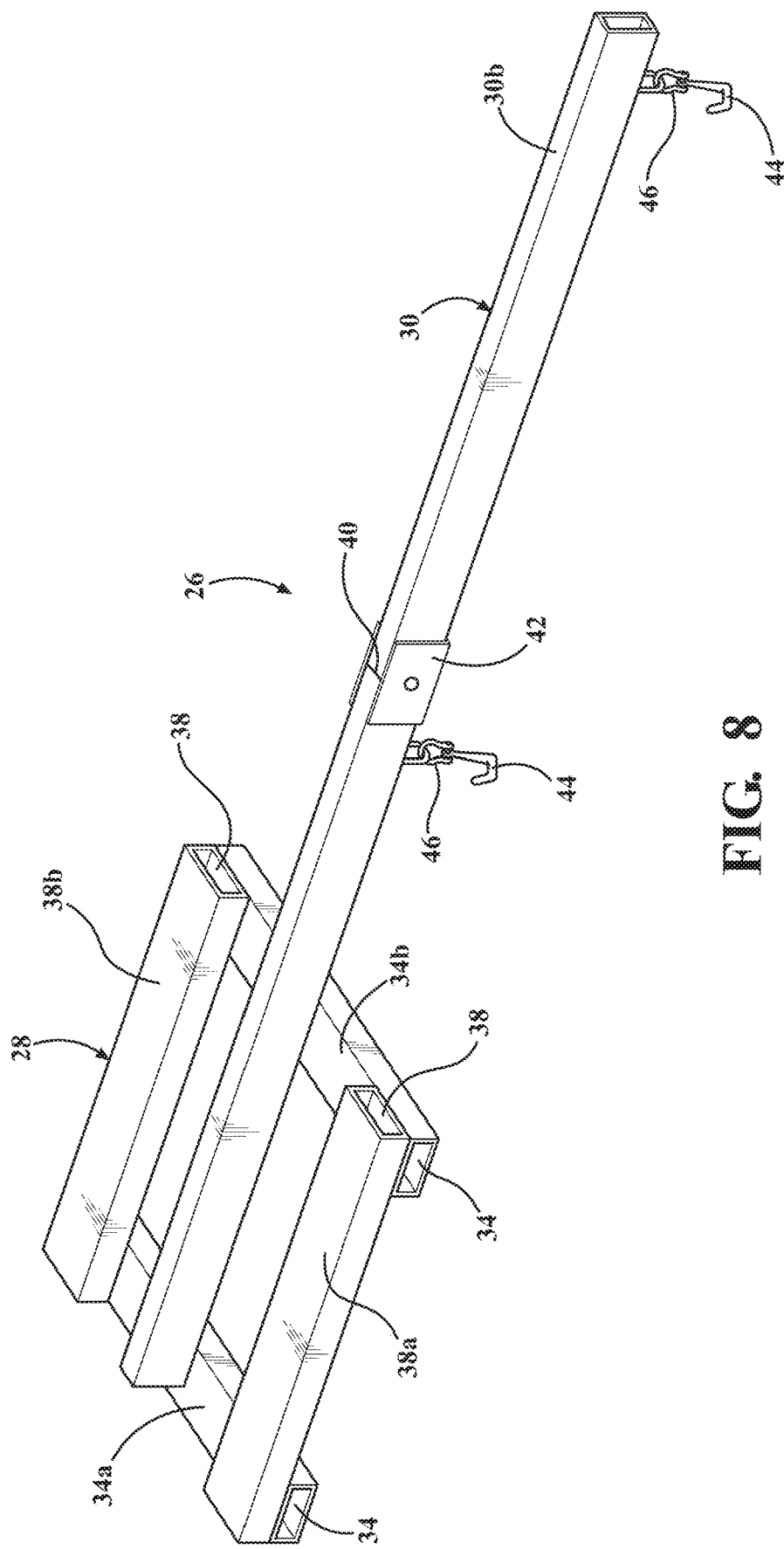
FIG. 8 is a perspective view of another embodiment of a tarp lifting device.
Figure 9:
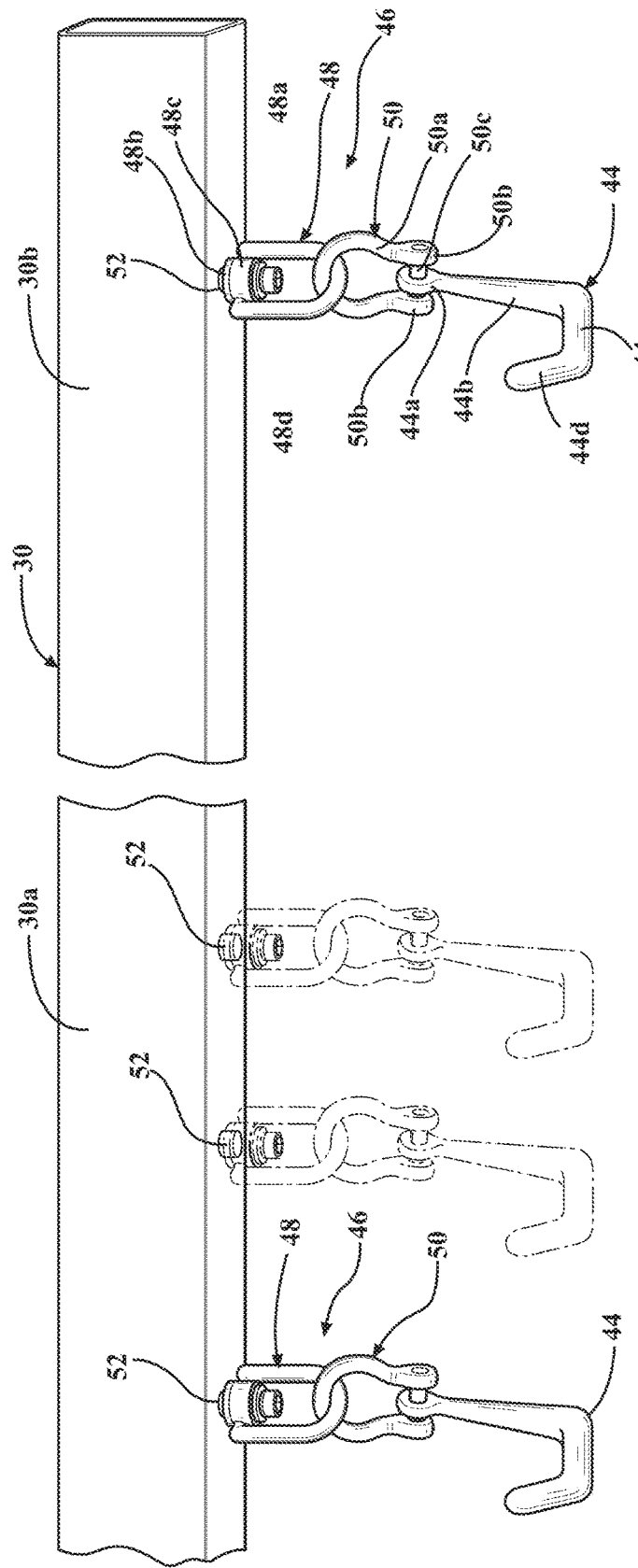
FIG. 9 is a fragmentary perspective view illustrating details of the tarp lifting device of FIG. 9.
Figure 10:
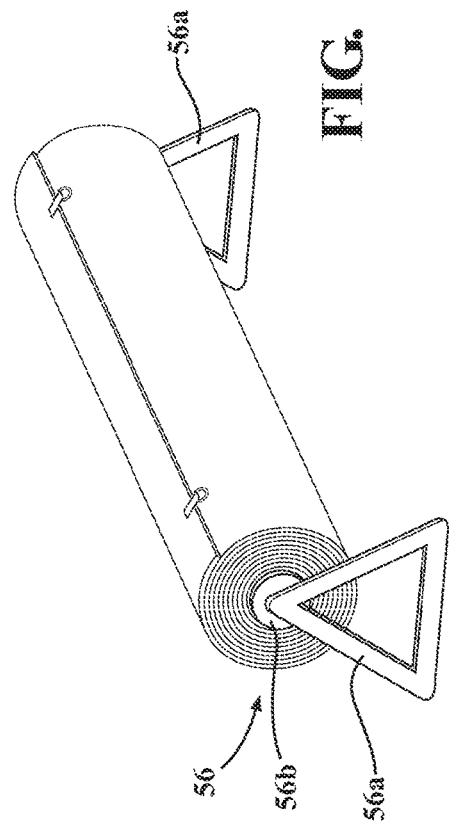
FIG. 10 is a perspective view of a tarp storage device.
Figure 11:
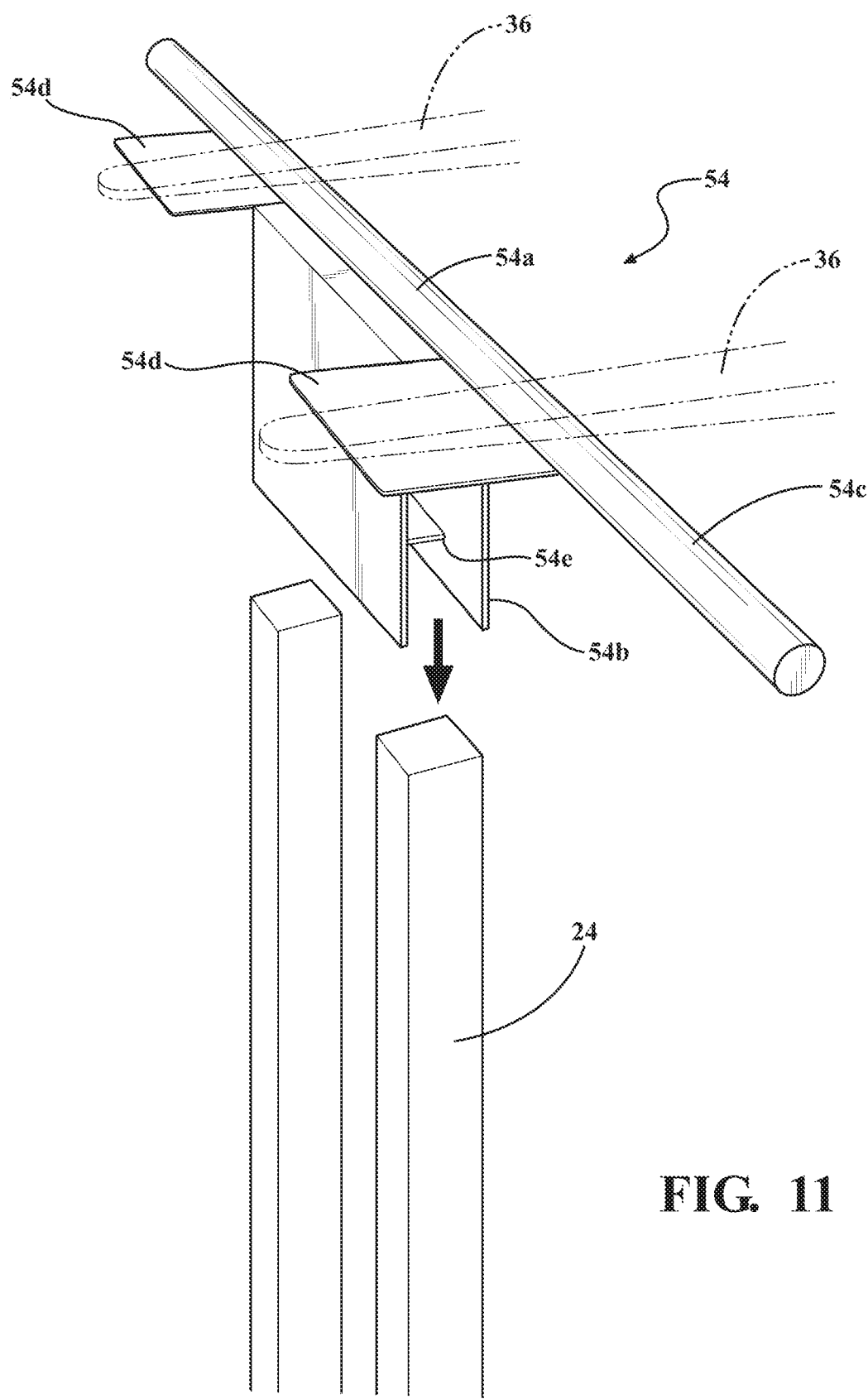
FIG. 11 is a perspective view of a tarp guide device.

An apparatus 10 is provided for positioning a tarpaulin or tarp 12 on a payload 14 supported on a bed 16 of a moveable vehicle 18.

The tarp 12 comprises a flexible sheet such as woven fabric, plastic or the like of the type typically used to cover payloads 14 when being transported on the bed 16 of a truck, trailer or other such movable vehicle 18 in the event of inclement weather or when it is otherwise desired to protect the payload 14 from exposure to the elements or to conceal the payload 14.

The tarp 12 will typically have several anchors or anchor points 20 that are typically used for tightly wrapping the tarp 12 about the payload 14 and also securing the tarp 12 to structure of the vehicle 18, such as by numerous elastic cords or the like. The anchors 20 may take the common form of anchor loops, such as metal D-rings, that as sewn or otherwise secured at designated spaced locations across the width and length of the tarp 12. Different ones of the anchor points 20 may be used when wrapping and securing the tarp 12 depending on the size and shape of the payload 14 and the structure of the bed 16 and associated vehicle 18 to which the tarp 12 is applied. The tarp 12 will be considered to be generally rectangular and will have a forward or leading end, an opposite trailing or rearward end and two opposite sides. Some of the anchors 20 will be understood to be provided at or near the leading or forward end of the tarp 12 and will be utilized, as will be described in detail below, for placing the tarp 12 with use of the apparatus 10. When draped over the payload 14, the tarp 12 will be relatively longer and wider than the payload 14 to be covered so that complete front, back and side concealment and protection of the payload 14 can be achieved with use of the tarp 12.

The payload 14 can, for example, be a stack or stacks of drywall. Other material or goods are also contemplated, but the apparatus 10 finds particular use in concealing drywall and other stacks of building materials such as OSB, plywood, lumber and the like. It is to be understood that the selection of payload 14 is not limiting of the invention, as the invention is limited only by the claims and not the embodiments described herein.

The vehicle 18 may comprise a boom truck of the type having an elevated bed 16 extending rearward of a cab and including an onboard material unloader crane that may comprise a telescoping payload boom 22 mounted at or toward the front of the bed 16 and extending therefrom to a distal end that is outfitted to engage and offload the payload, such as stacks of drywall, at a delivery site such as a job site. Such trucks are often utilized for transporting and offloading drywall to job sites. When not in use, the boom 22 is collapsed to a stowed condition and the distal end outward of the forward base is cradled in a boom rack 24 that extends up from a rearward or back end of the bed 16. The boom rack 24 is well known and serves as a stable structure for supporting the boom 22 during transport or when otherwise not being used to offload payload material from the bed 16. The boom rack 24 has an upper end with exposed features and edges that are irregular and could snag on the tarp 12 or otherwise potentially catch or damage the tarp 12 is the tarp were drawn across the boom rack 24 when placed.

The apparatus 10 is operative for placing the tarp 12 in position over the payload 14, such as one or more stacks of drywall, without the need for any person to be present on the elevated bed 16 of the vehicle 18 or to climb on top of the payload 14, which may extend several feet above ground level (e.g., 8 to 10 feet or more is possible). The apparatus 10 is also operative for placing a tarp 12 on a payload 18 carried on the bed 16 of a boom-type truck 18 of the general type described above, where there is a boom rack 24 at the back of the bed 16 and a payload boom 22 overhead of the payload 14. A method of tarping a payload including on such a boom truck will also be described below.

The apparats 10 includes a tarp lifting device 26. The tarp lifting device has a carriage or base 28 and a support arm 30 that is fixed to and projects from the base 28 in cantilevered fashion. The base 28 is engagable by a forklift truck 32 for lifting and moving the carriage 28 and support arm 30 as a unit. The base 28 has at least one pair of fork-engaging pockets 34 for receiving a pair of forks 36 of the forklift truck 32. The pair of forklift pockets 34 are generally and preferably parallel and are spaced and configured to accept the forks 36 into at least one open end of the pockets 34. The opposite end of the pockets 34 may also be open to alternatively receive the forks in the opposite end. The fork pockets 34 are arranged transverse to the lengthwise direction of the support arm 30 when the tarp lifting device 26 is in use. The support arm 30 may be fixed in one position on the base 28 or it may be selectively rotatable to different rotatable positions relative to the orientation of the fork pockets 34. In one embodiment the support arm 30 is selectively positionable rotatably relative to the fork pockets (either perpendicular or parallel to the fork pockets) and in another embodiment the support arm 30 is permanently fixed on the base 28, such as by welding, to be transverse and preferably perpendicular to the fork pockets 34 so that when the forks 36 of the fork truck 32 are received in the fork pockets 34, the support arm 30 projects laterally to the side of the forklift truck 32.

The tarp lifting device 26 may further include a second pair of fork pockets 38. The second pair of fork pockets 38 are disposed transversely to the first pair of fork pockets 34, and preferably perpendicular thereto. The second pair of fork pockets 38 are parallel to the lengthwise direction of the support arm 30. The support arm 30 is preferably spaced between the second pair of fork pockets 38. When the forks 36 of the forklift truck 32 are received in the second pair of fork pockets 38, the support arm 30 projects forwardly of the forklift truck 32 in the direction of forward travel. When the base has both first and second pairs of fork pockets 34, 38, the base can be configured from rectangular steel tube stock with two lengths of rectangular steel tubing 34a, 34b arranged in laterally spaced and parallel relation to one another to form the first pair of fork pockets 34 and two more lengths of rectangular steel tubing 38a, 38b arranged in the same lateral and parallel arrangement relative to one another, but perpendicular to the first pair 34a, 34b. The two sets of tubing may be secured by welding to create a rigid structural rectangular framework for the base 28, with one set 38a, 38b stacked on top and crosswise to the other set 34a, 34b below. The base 28 may have a dimension of 4'×4'.

The support arm 30 may be fabricated of structural tubing, such as rectangular steel tube stock. The tube may be square or may have a height that is greater than its width when projecting outward from the base 28. The support arm 30 has a mounted portion 30a which is fixed to the base 28 and an extended portion 30b which cantilevers outward of the base 28. The mounted portion 30a may rest on and be secured such as by welding to the first pair 34a, 34b of structural members that provide the fork pockets 34. In the case where rectangular steel tubing is used for the lower extent of the base 28 to provide the pockets 34, the mounted portion 30a of the support arm 30 bridges between and is fixed to each of the steel tubing portions 34a, 34b. The second pair of steel tubing sections 38a, 38b that provide the second pair of fork pockets 38 may be disposed on either side of the mounted portion 30a.

The support arm 30 projects outward from the base 28 to a distal end 30c. The length of the extended portion 30b is sufficient to span the width of the payload 14 when the forklift truck 32 is supporting the tarp lifting device 26 alongside the bed 16. In practice, there will be a lane or path established alongside the bed 16 along which the forklift truck 32 will travel during placement of the tarp 12. The lane may be such that the forklift truck 32 is several feet away from the side edge of the bed 16, such as 4 feet. The extended portion 30b of the support arm 30 will take this spacing into account and will add additional length to account for the width of the bed 16 on which the payload 14 will be supported. For example, the extended portion 30b of the support arm 30 may be about 12 to 16 or more feet in length. The support arm 30 may be of one piece and of fixed length, or the support arm may be adjustable in length. The support arm 30, if of more than one piece, may be hinged to enable the arm to be folded back on itself when not in use to achieve a more compact form of the tarp lifting device 26 for ease of storage, transport and/or handling. When extended, the hinge joint connecting the two portions may be suitably locked out so as to render the support arm 30 rigid and able to support a lifting load without hinging at the joint. An exemplary hinge is shown at 40 in one of the embodiments and a corresponding hinge lock-out cuff is shown at 42 to disable the hinge and rigidly lock the support arm when fully extended to the use condition.

A plurality of lifting hooks 44 are provided at longitudinally spaced locations along the length of the support arm 30. There are preferably two of such hooks 44 and the spacing between the hooks 44 may be fixed or the spacing may be adjustable. One of the hooks is located near the distal free end of the support arm 30 and the other is relatively closer to the base 28. The spacing between the hooks 40 is selected to correspond with the payload to be covered and with the predetermined fixed location of the anchor points 20 of the tarp 12 to be placed. It will be understood that the distance will thus depend in part on the tarp 12 to be placed and on the width of the payload 14. For example, the hooks 40 may be spaced in the range of 102" to 110" apart. One of the hooks 40, such as the distal-most hook 40, may be fixed in location, whereas the other hook that is closer to the base may be supported at selected different locations along the support arm 30 to achieve the desired spacing between the hooks 40.

The hooks 44 are preferably J-hooks. The hooks 44 include an eye 44a at an upper end of the hooks 44, a preferably straight shank 44b extending straight down from the eye 44a to a relatively shorter base 44c portion that extends perpendicular to the shank 44b and terminates in an angular tip portion 44d that is linear and projects upwardly from the base 44c at about a 45 degree angle. The base 44c and tip 44d portions are each shorter in length than the shank 44b. The shank 44b is longer than the tip portion 44d which is longer than the base 44c.

Articulated mounting linkages 46 support the J-hooks 40 on the support arm 30. The linkages 46 are operative to enable the J-hooks to move in many directions relative to the support arm 30 during the installation of the tarp 12. The articulated linkages 46 enable the hooks 44 to rotate relative to the support arm 30 about rotation axes that are transverse to the longitudinal axis of the support arm 30. The linkages 46 are further operative to enable the hooks 44 to pivot about pivot axes that are transverse to the rotation axes. The linkages 46 further are operative to enable the hooks 44 to translate toward and away from the support arm 30 such that there is a certain amount of play in the length of the linkage 44.

Each linkage 46 includes an upper swivel shackle 48 having a threaded mounting stud 48a, a base 48b, a swivel body 48c supported by the stud 48a and base 48b for relative rotation about the axis of the stud 48a and a U-shaped bow 48d having opposite legs supported on the swivel body 48c for rotation therewith and projecting downwardly therefrom to provide a closed loop or ring. Each linkage 46 further includes and intermediate anchor shackle 50 having a bow portion 50a looped through the bow 48d of the swivel shackle 50 and terminating at lower eyes 50b that are laterally spaced to accept the eye 44a of the hook 44 therebetween and a pin 50c extending through the aligned eyes 50b, 44a to couple the hook 44 to the anchor shackle 50. It will be appreciated that the pin 50c provides pivotal movement to the hook 44, the swivel shackle 48 provides rotational movement to the hook 44, and the loops of the bows 48d, 50a enable translational movement due to the freedom of movement in the longitudinal direction of the linkage 44 provided by the linked loops of the bow portions 48d, 50a. The links further offer a further degree of swinging movement to the hooks as well as a certain amount of rotational play to the linkage 46.

The support arm 30 is provided with a plurality of mounting sites 52 to threadably receive the studs 48a of the swivel shackles 48. This may take the form of threaded openings in the support arm 30, preferably along the bottom or underside of the support arm 30. One way to achieve this is to drill holes in the support arm 30 of sufficient size to receive the studs 48a, and then weld threaded nuts to the outside of the support arm 30 about the holes for threaded connection with the studs 48a. There are preferably more mounting sites 52 than there are hooks 44. For example, there may be a single mounting site 52 provided near the distal end of the support arm 30 to mount a linkage 46 and hook 44 assembly, while further inward there may be two or more spaced mounting sites 52 that permit the second hook and linkage assembly 44,46 to be mounted in one of two different locations spaced at different distances from the distal hook and linkage 44,46 assembly. An embodiment may include 3, 4 or more such mounting sites for the inwardly located adjustable hook and linkage assembly 44,46 to achieve the desired spacing between the hooks 44.

The apparatus 10 may further include a tarp guide 54. The tarp guide 54 fits over the top of the boom rack 24 and serves to shield the tarp 12 from contacting the top of the boom rack 24 during placement and further serves to provide an upper guide surface 54a for engagement by the tarp 12 during placement. The tarp guide 54 includes a lower sleeve portion 54b that slips over the boom rack 24 and a crossbar 54c that projects above and crosswise to the sleeve 54b so as to extend widthwise at the rear of the bed 16 to guide the tarp 12. A pair of flats 54d are provided on the tarp guide 54 for engagement with the forks 36 of the forklift truck 32. The flats comprise tabs 54d that are fixed to the crossbar 54c and preferably to a lower region of the crossbar 54c on opposite sides of the sleeve 54b. The tabs 54d project forwardly toward the bed 16 and payload 14 and are disposed out of the path of the tarp 12 during placement such that the tarp does not engage the tabs 54d. Within the sleeve 54b there may be stop surfaces 54e which confront corresponding structure of the boom rack 24 when the sleeve 54b is slid into position over the book rack 24. Fore and aft walls of the sleeve 24b engage structure of the boom rack 24 to provide lateral support to the tarp guide, while the stop surfaces 54e provide vertical support.

The apparatus 10 may further include a tarp storage device 56. The tarp storage device 56 may be located on the ground in the vicinity of the back of the bed 16 for storing the tarp 12 in ready condition for placement on the payload 14. The storage device 56 may include a frame 56a and a reel 56b supported by the frame 56a. The tarp 12 may be spooled onto the reel 56b for storage and unspooled during placement of the tarp 12.

A method of installing the tarp 12 on the payload 14 includes raising the boom 22 above the boom rack 24 to expose the top of the boom rack 24 and to create a gap of space between raised end of the boom 22 and the rack 24. Once raised, the operator of the forklift truck 32 engages the forks 36 with the tabs 54*d* of the tarp guide 54. The forks 36 are raised and the sleeve 54*b* is slid into positon over the upper end of the boom rack 24 with the tabs 54*d* facing forwardly of the bed 16. Once positioned, the forks are lowered and the sleeve 54*b* supports the crossbar 54*c* crosswise to the bed at an elevated position above the boom rack 24.

The operator then extends the forks 36 into the pockets 34 of the tarp lifting device 26 and moves the lifting device 26 to a location behind the bed 16 to attach the tarp 12. The operator manually manipulates the hooks 44 to slip them into engagement with the anchor points (D-rings) 20 of the tarp 12 provided adjacent a forward region of the tarp 12. The tarp 12 may be laid out lengthwise behind the bed 16 or may be spooled on the reel 56*b* of the tarp storage device. The forks 36 and this the support arm 30 and leading end of the tarp 12 are then raised above the level of the crossbar 54*c* and payload 14 and the forklift driven along a path alongside the bed 16 to drag the tarp 12 across the crossbar 54*c* and beneath the raised boom 22. Movement of the forklift 32 continues until the tarp is drawn forward over top of the payload 14 with sides of the tarp draping down over sides of the payload 14 and leaving front and rear portions of the tarp 12 of sufficient length to drape and cover the fore and aft ends of the payload 14. During placement of the tarp 12, the linkages 46 are under tension and draw the tarp 12 along. Once in final position, the forks 36 are lowered which causes the tension in the linkages 46 to slacken and the hooks 44 to fall free of the anchor points 20 and thus self-disconnect from the tarp 12. The shape of the hooks 44, action of the linkages 46 and lack of a latch across the mouth of the hooks 44 enables easy release of the hooks 44 once the tarp is placed and the tension on the hooks 44 is released by lowering the support arm 30. It will be appreciated that the placement of the tarp over the payload did not involve any operator being present on the bed 16 or on top of the payload 14. The operator remains at all times on the ground and may be the person operating the forklift truck 32.

Once placed, the operator may further wrap the tarp 12 about the sides and ends of the payload 14 and secure the tarp 12 to the vehicle 18 in the usual manner, such as with elastic cords.

Obviously, many modifications and variations of the present invention are possible in light of the above teachings. It is, therefore, to be understood that the invention may be practiced otherwise than as specifically described while still being within the scope of the invention.

What is claimed is:

1. Apparatus for positioning a tarp over a payload on an elevated bed of a mobile vehicle, said apparatus comprising:
   a carriage having fork engaging structure for engagement by the forks of a fork truck to lift and move the carriage;
   a support arm cantilevered from the carriage a distance sufficient to span the width of the payload on the bed of the vehicle when the forklift is supporting the carriage and positioned alongside the bed of the vehicle; and
   at least two tarp-engaging hooks mounted by articulated links to the support arm in laterally spaced relation to the carriage and to one another, the articulated links supporting the hooks for rotation relative to the support arm about respective rotation axes that are transverse to a lengthwise direction of the support arm, the articulated links further supporting the hooks for pivoting relative the support arm about respective pivot axes that are transverse to the respective rotation axes of the hooks, the articulated links further supporting the hooks for translational movement relative to the support arm, the hooks are generally J-shaped and wherein the hooks in combination with the articulated links are operative to enable the hooks to engage ring anchors provided on the tarp for lifting and drawing the tarp into place over the payload in response to an applied tension force resulting from movement of the forklift alongside the bed while the support arm is raised above the level of the payload, and wherein the hooks in combination with the articulated links are further operable to enable the hooks to self-release from engagement with the anchors of the tarp in response to lowering the support arm and releasing the applied tension force following the placement of the tarp without the assistance of an operator in both the placement of the tarp and release of the hooks, and
   wherein the articulated links include a swivel shackle associated with each hook that is fixed to the support arm and providing the relative rotational movement, and
   wherein the articulated links further include an anchor shackle having a bow thereof coupled to a bow of the swivel shackle and a pin thereof extending through an eye of the associated J-hook for providing both the relative pivoting and articulating movements, and
   wherein a bolt secures each swivel shackle to the support arm, and
   wherein the support arm includes a plurality of threaded openings spaced along a length of the support arm and each configured to threadably mount the bolts and there being more threaded openings than there are bolts to enable adjustment in the relative positions of the hooks.

2. The apparatus of claim 1 wherein the hooks are suspended from an underside of the support arm.

3. The apparatus of claim 1 wherein the fork engaging structure includes at least a first pair of fork pockets that are sized and positioned to receive forks of the forklift truck therein for lifting and moving the carriage.

4. The apparatus of claim 1 including a tarp storage station for storing the tarp to be placed by the support arm.

5. The apparatus of claim 4 wherein the carriage includes a second pair of fork pockets that are arranged transverse to the at least first pair of fork pockets.

6. The apparatus of claim 5 wherein the support arm is disposed between and is parallel to the second set of fork pockets.

7. The apparatus of claim 1 including a tarp guide releasably mountable on the movable vehicle and having a guide surface that when mounted is in position to engage the tarp while being drawn into position over the payload.

8. The apparatus of claim 7 wherein the tarp guide is mountable on an upstanding support rack of the vehicle.

9. The apparatus of claim 8 wherein the tarp guide includes a lower sleeve portion that is slideable into position over the support rack and a cross bar that projects above the sleeve portion and extends laterally of the sleeve portion in opposite directions for engagement by the tarp during placement.

10. The apparatus of claim 9 wherein the tarp guide includes a pair of fork-engaging flats on the cross bar.

11. The apparatus of claim 10 wherein the flats are provided on a bottom portion of the cross bar on opposite sides of the sleeve portion and projecting forwardly toward the payload when the tarp guide is mounted on the support rack of the vehicle.

12. The apparatus of claim 11 wherein the flats are located so as to not engage the tarp when the tarp is guided by the cross bar during placement of the tarp.

13. The apparatus of claim 1 wherein the support arm is selectively hingable between an extended use position and folded stowed position.

14. The apparatus of claim 1 including a tarp storage station for storing the tarpaulin to be placed by the support arm.

15. Apparatus for positioning a tarp over a payload on an elevated bed of a mobile vehicle equipped with a payload boom and a boom rack located at a rear of the bed, said apparatus comprising:
a carriage engagable by forks of a fork truck to lift and move the carriage;
a support arm cantilevered from the carriage a distance sufficient to span the width of the payload on the bed of the vehicle when the forklift is supporting the carriage and positioned alongside the bed of the vehicle;
a tarp guide positionable over an upper end of the boom rack when the payload boom is in a raised position above the boom rack and operative to actively support the tarp during positioning and shield the tarp from dragging across the upper end of the boom rack;
at least two lifting hooks carried by the support arm that are engagable with the tarp and operative to lift and drag the tarp across the tarp guide and into position over the payload through operation of the fork lift in lifting and moving the support arm alongside the bed of the vehicle. while anchors of the sites tarp-engaging hooks mounted by articulated links to the support arm in laterally spaced relation to the carriage and to one another, the articulated links supporting the hooks for rotation relative to the support arm about respective rotation axes that are transverse to a lengthwise direction of the support arm, the articulated links further supporting the hooks for pivoting relative the support arm about respective pivot axes that are transverse to the respective rotation axes of the hooks, the articulated links further supporting the hooks for translational movement relative to the support arm, the hooks are generally J-shaped and wherein the hooks in combination with the articulated links are operative to enable the hooks to engage ring anchors provided on the tarp for lifting and drawing the tarp into place over the payload in response to an applied tension force resulting from movement of the forklift alongside the bed while the support arm is raised above the level of the payload, and wherein the hooks in combination with the articulated links are further operable to enable the hooks to self-release from engagement with the anchors of the tarp in response to lowering the support arm and releasing the applied tension force following the placement of the tarp without the assistance of an operator in both the placement of the tarp and release of the hooks.

16. A method for placing a tarp to cover a payload on the bed of a vehicle, comprising;
engaging a carriage of a tarp lifting device with forks of a forklift truck such that a support arm of the tarp lifting device projects laterally of the forklift a distance sufficient to span the payload when the forklift is driven along a tarping lane adjacent the bed of the vehicle;
connecting lifting hooks of the support arm with ring anchors provided adjacent a leading end of the tarp and lifting the tarp with the support arm through operation of the forklift to a level above the height of the payload;
driving the forklift along the tarping lane with the support arm elevated to draw the tarp under a tension load between the hooks and ring anchors into position over the load; and
once the tarp has been drawn into position, lowering the support arm and releasing tension on the hooks to cause them to disengage from the tarp without assistance from an operator.

17. The method of claim 16, wherein the vehicle includes a payload boom used for offloading the payload and an elevated boom rack at a back of the vehicle for supporting the payload boom when not in use, and wherein the method further includes raising the payload boom off the boom rack to create a gap, placing a tarp guide onto the boom rack to provide a guide surface to the tarp so it does not drag against the top of the boom rack during placement of the tarp; and manipulating the forklift during placement of the tarp to guide the support arm and tarp through the gap with the tarp dragging across the tarp guide out of contact with the payload boom and the top of the boom rack.

18. Apparatus for positioning a tarp over a payload on an elevated bed of a mobile vehicle, said apparatus comprising:
a carriage having fork engaging structure for engagement by the forks of a fork truck to lift and move the carriage;
a support arm cantilevered from the carriage a distance sufficient to span the width of the payload on the bed of the vehicle when the forklift is supporting the carriage and positioned alongside the bed of the vehicle; and
at least two tarp-engaging hooks mounted by articulated links to the support arm in laterally spaced relation to the carriage and to one another, the articulated links supporting the hooks for rotation relative to the support arm about respective rotation axes that are transverse to a lengthwise direction of the support arm, the articulated links further supporting the hooks for pivoting relative the support arm about respective pivot axes that are transverse to the respective rotation axes of the hooks, the articulated links further supporting the hooks for translational movement relative to the support arm, the hooks are generally J-shaped and wherein the hooks in combination with the articulated links are operative to enable the hooks to engage ring anchors provided on the tarp for lifting and drawing the tarp into place over the payload in response to an applied tension force resulting from movement of the forklift alongside the bed while the support arm is raised above the level of the payload, and wherein the hooks in combination with the articulated links are further operable to enable the hooks to self-release from engagement with the anchors of the tarp in response to lowering the support arm and releasing the applied tension force following the placement of the tarp without the assistance of an operator in both the placement of the tarp and release of the hooks, and
wherein the articulated links include a swivel shackle associated with each hook that is fixed to the support arm and providing the relative rotational movement, and
wherein the articulated links further include an anchor shackle having a bow thereof coupled to a bow of the swivel shackle and a pin thereof extending through an eye of the associated J-hook for providing both the relative pivoting and articulating movements, and
wherein a bolt secures each swivel shackle to the support arm, and
wherein the support arm includes a plurality of threaded openings spaced along a length of the support arm and each configured to threadably mount the bolts and there being more threaded openings than there are bolts to enable adjustment in the relative positions of the hooks, and including a tarp guide releasably mountable on the movable vehicle and having a guide surface that when mounted is in position to engage the tarp while being drawn into position over the payload.

19. The apparatus of claim 18 wherein the tarp guide is mountable on an upstanding support rack of the vehicle.

* * * * *